US011159456B2

(12) United States Patent
Yamamoto et al.

(10) Patent No.: US 11,159,456 B2
(45) Date of Patent: Oct. 26, 2021

(54) CONTROL APPARATUS

(71) Applicant: HITACHI AUTOMOTIVE SYSTEMS, LTD., Hitachinaka (JP)

(72) Inventors: Naoyuki Yamamoto, Hitachinaka (JP); Kenichi Osada, Hitachinaka (JP); Shuhei Kaneko, Hitachinaka (JP); Hitoshi Kawaguchi, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/631,736

(22) PCT Filed: Jul. 18, 2018

(86) PCT No.: PCT/JP2018/026815
§ 371 (c)(1),
(2) Date: Jan. 16, 2020

(87) PCT Pub. No.: WO2019/026613
PCT Pub. Date: Feb. 7, 2019

(65) Prior Publication Data
US 2020/0186470 A1    Jun. 11, 2020

(30) Foreign Application Priority Data
Aug. 3, 2017   (JP) .............................. JP2017-151078

(51) Int. Cl.
*H04L 12/861* (2013.01)
*H04L 1/08* (2006.01)
(Continued)

(52) U.S. Cl.
CPC ............ *H04L 49/9084* (2013.01); *H04L 1/08* (2013.01); *H04L 45/745* (2013.01); *H04L 47/24* (2013.01); *H04L 47/32* (2013.01); *H04L 49/90* (2013.01)

(58) Field of Classification Search
CPC ... H04L 49/9084; H04L 49/90; H04L 47/245; H04L 47/10
See application file for complete search history.

(56) References Cited

U.S. PATENT DOCUMENTS 5,539,747 A    7/1996 Ito et al.
5,544,326 A *  8/1996 Pease .................... G06F 5/12
                                                  710/310
(Continued)

FOREIGN PATENT DOCUMENTS

JP    S63-209247 A    8/1988
JP    H06-284453 A   10/1994
(Continued)

OTHER PUBLICATIONS

International Search Report with English translation and Written Opinion issued in corresponding application No. PCT/JP2018/026815 dated Oct. 23, 2018.
Extended European Search Report issued in corresponding European Patent Application No. 18840460.2, dated Feb. 9, 2021.

*Primary Examiner* — Min Jung
(74) *Attorney, Agent, or Firm* — Foley & Lardner LLP

(57) ABSTRACT

It is possible to perform transfer with low latency. The control apparatus includes a routing control unit, transmission queues, and a plurality of controllers. The routing control unit includes a buffer, a normal transmission unit configured to output, among inputted frames, a frame other than a frame to be retransmitted to the transmission queue of the controller corresponding to a network serving as a transfer destination, and, when the controller corresponding to the network serving as the transfer destination is in a full state in which no more frames cannot be stored in the transmission queue, specify the inputted frame as the frame to be retransmitted and store the inputted frame in the buffer, and a signal handling unit configured to, when a cancellation signal indicating that the full state has been canceled is (Continued)

received from any of the plurality of controllers, output, to the transmission queue of the controller that has transmitted the cancellation signal, the frame to be retransmitted that is to be transferred to the network corresponding to the controller that has transmitted the cancellation signal. When the full state is canceled, the controller transmits the cancellation signal to the signal handling unit.

7 Claims, 15 Drawing Sheets

(51) Int. Cl.
*H04L 12/741* (2013.01)
*H04L 12/851* (2013.01)
*H04L 12/823* (2013.01)

(56) References Cited

U.S. PATENT DOCUMENTS

| | | | |
|---|---|---|---|
| 5,809,078 A * | 9/1998 | Tani | H04L 49/90 |
| | | | 365/194 |
| 6,252,849 B1 | 6/2001 | Rom | |
| 9,621,484 B2 * | 4/2017 | Srinivasan | H04L 49/9005 |
| 9,774,511 B2 * | 9/2017 | English | H04L 47/70 |
| 2017/0012851 A1 * | 1/2017 | Teeter | H04L 43/04 |
| 2017/0055031 A1 * | 2/2017 | Park | G06F 13/4059 |

FOREIGN PATENT DOCUMENTS

| | | |
|---|---|---|
| JP | H08-65308 A | 3/1996 |
| JP | 2002-519912 A | 7/2002 |
| JP | 2004-350138 A | 12/2004 |

* cited by examiner

FIG. 3

| PRIORITY RULE ||
|---|---|
| PRIORITY | ID |
| 1 | 10 |
| 2 | 192. 168. 1. 10 |
| 3 | 20 |
| 4 | 30 |
| 5 | 192. 168. 1. 20 |
| . | . |
| . | . |

| ROUTING TABLE | | | 16 |
|---|---|---|---|
| ID | TRANSFER DESTINATION CHANNEL | RETRY bit | |
| 10 | 3 | 000100 | |
| 20 | 3、4、5 | 001100 | |
| 30 | 3 | 000000 | |
| . | . | . | |

*FIG. 5*

| RETRY COUNTER ||||||
|---|---|---|---|---|---|
| CH6 | CH5 | CH4 | CH3 | CH2 | CH1 |
| 0 | 0 | 1 | 2 | 0 | 0 |

| RETRANSMISSION MANAGEMENT TABLE | 18 |
|---|---|
| ID | TARGET TO BE RETRANSMITTED |
| 10 | YES |
| 20 | NO |
| 30 | NO |
| . | . |

CONTROL APPARATUS

TECHNICAL FIELD

The present invention relates to a control apparatus.

BACKGROUND ART

A plurality of electronic control units is mounted on a vehicle, and each electronic control unit communicates via a network. When the electronic control units communicate over a plurality of networks, it may take time to relay the communication, and prompt communication is required.

PTL 1 discloses a data relay apparatus that is connected to a plurality of multiplex communication lines for transmitting data and outputs each piece of data transmitted by each multiplex communication line to another multiplex communication line, the data relay apparatus including: a reception buffer group including a plurality of buffers for temporarily holding the data received via the multiplex communication lines of relay sources; a main buffer group including a plurality of buffers for receiving the data transferred from the reception buffer group and temporarily holding the data prior to transmission of the data to the multiplex communication lines of relay destinations; first transfer means for transferring the data held in the reception buffer group to the main buffer group; and transmission means for transmitting the data held in the main buffer group to the multiplex communication lines of the relay destinations, in which the first transfer means collectively transfer the data held in the reception buffer group to the main buffer group at predetermined time intervals.

CITATION LIST

Patent Literature

PTL 1: JP 2004-350138 A

SUMMARY OF INVENTION

Technical Problem

The invention disclosed in PTL 1 can be further improved in terms of latency at the time of transferring data.

Solution to Problem

A control apparatus according to a first aspect of the present invention is a control apparatus that is connectable to a plurality of networks and transfers frames between the plurality of networks, the control apparatus including: a routing control unit configured to control transfer of the frames; and a plurality of controllers, each of which is provided for a corresponding one of the plurality of networks, includes a transmission queue for receiving the frame from the network and inputting the frame to the routing control unit, and storing the frame that is output from the routing control unit and is to be transferred to the network serving as a transfer destination, and transmits the frame stored in the transmission queue to the network, in which the routing control unit includes a buffer configured to store, among the inputted frames, a specified frame as a frame to be retransmitted, a normal transmission unit configured to output, among the inputted frames, a frame other than the frame to be retransmitted to the transmission queue of the controller corresponding to the network serving as the transfer destination, and, when the controller corresponding to the network serving as the transfer destination is in a full state in which no more frames cannot be stored in the transmission queue, specify the inputted frame as the frame to be retransmitted and store the inputted frame in the buffer, and a signal handling unit configured to, when a cancellation signal indicating that the full state has been canceled is received from any of the plurality of controllers, output, to the transmission queue of the controller that has transmitted the transmission queue, the frame to be retransmitted that is to be transferred to the network corresponding to the controller that has transmitted the cancellation signal; and when the full state is canceled, the controller transmits the cancellation signal to the signal handling unit.

Advantageous Effects of Invention

According to the present invention, it is possible to transfer a frame and a frame to be retransmitted with low latency.

BRIEF DESCRIPTION OF DRAWINGS

FIG. 3 shows an example of a priority rule 15.

FIG. 4 shows an example of a routing table 16.

FIG. 5 shows an example of a retry counter 17.

FIG. 12 shows an example of a retransmission management table 18 in a first modification example.

DESCRIPTION OF EMBODIMENTS

First Embodiment

Hereinafter, a first embodiment of a control apparatus according to the present invention will be described with reference to FIGS. 1 to 11. The control apparatus is connected to at least two networks. In the present embodiment, description will be made assuming that the control apparatus is connected to six networks.

(Hardware Configuration)

Figure 1:
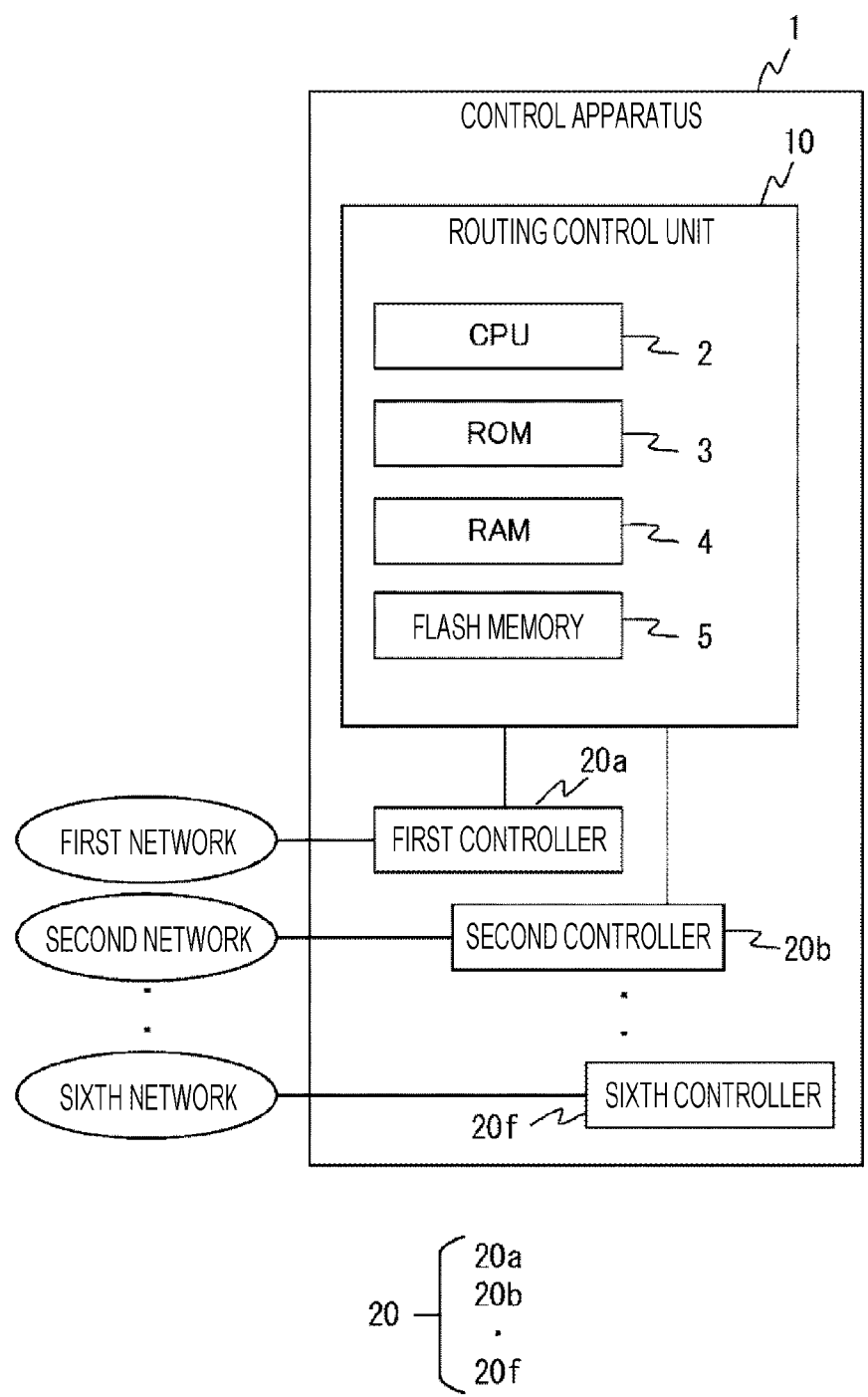
FIG. 1 is a hardware configuration diagram of a control apparatus 1.

FIG. 1 is a hardware configuration diagram of a control apparatus 1. The control apparatus 1 is connected to a plurality of networks, i.e., six (first to sixth) networks. The six networks are, for example, controller area networks (CANs), TCP/IP, and local interconnect networks (LINs). However, a communication protocol used in each network is not limited thereto, and the control apparatus may be connected to media oriented system transport (MOST) or FlexRay. The same communication protocol may be used in the networks. The control apparatus 1 may be connected to two to five networks, or may be connected to seven or more networks.

The control apparatus 1 includes a routing control unit 10 and six controllers that are the same as the number of networks to be connected, i.e., a first controller 20a, a second controller 20b, a third controller 20c, a fourth controller 20d, a fifth controller 20e, and a sixth controller 20f. Each of the first to sixth controllers 20a to 20f is provided in the control apparatus 1 for a corresponding one of the first to sixth networks, and transmits/receives a frame to/from the corresponding network. Name of a group of data to be transmitted/received is different depending on the communication protocol. However, the group of data will be referred to as "frame" in this embodiment, regardless of the communication protocol. Further, an identifier for identifying a frame is different depending on the communication protocol. However, in this embodiment, the frame is identified by an "ID" in all communication protocols. For example, the "ID" is a CAN-ID in CAN, a protected ID in LIN, or a destination IP address in TCP/IP. However, other values may be used for the ID. For example, in TCP/IP, a combination of an IP address of a source and a port number of a destination may be used.

Hereinafter, the first controller 20a, the second controller 20b, the third controller 20c, the fourth control 20d, the fifth controller 20e, and the sixth controller 20f are collectively referred to as "controllers 20". Each of the controllers 20 is connected to the routing control unit 10 via a signal line inside the control apparatus 1. The routing control unit 10 performs input/output of a frame from/to each controller 20 that transmits/receives a frame to/from the corresponding network, thereby controlling transfer of the frame between the first to sixth networks. For example, a frame transferred from the first network to the second network is first received by the first controller 20a. Then, the routing control unit 10 receives the frame from the first controller 20a, and outputs the frame to the second controller 20b serving as a transfer destination. Then, the second controller 20b transmits the frame to the second network. Hereinafter, the first to sixth controllers 20a to 20f will also be referred to as "first to sixth channels (CH1 to CH6)" in the description of operation of the routing control unit 10.

The routing control unit 10 includes a CPU 2 that is a central processing unit, a ROM 3 that is a read-only memory, a RAM 4 that is a readable/writable memory, and a flash memory 5 that is a nonvolatile storage device. The CPU 2 exhibits a function described later by developing a program stored in the ROM 3 in the RAM 4 and executing the program. Information stored in the flash memory 5 will be described later.

Each controller 20 is an application specific integrated circuit (ASIC). However, each or any of the controllers 20 may be configured as a field-programmable gate array (FPGA) or may be achieved by software. Software implementation means that each controller includes a CPU, a ROM, and a RAM (not shown), and the CPU develops a program stored in the ROM in the RAM and executes the program, thereby exhibiting a function similar to that of the ASIC.

(Functional Configuration)

Figure 2:
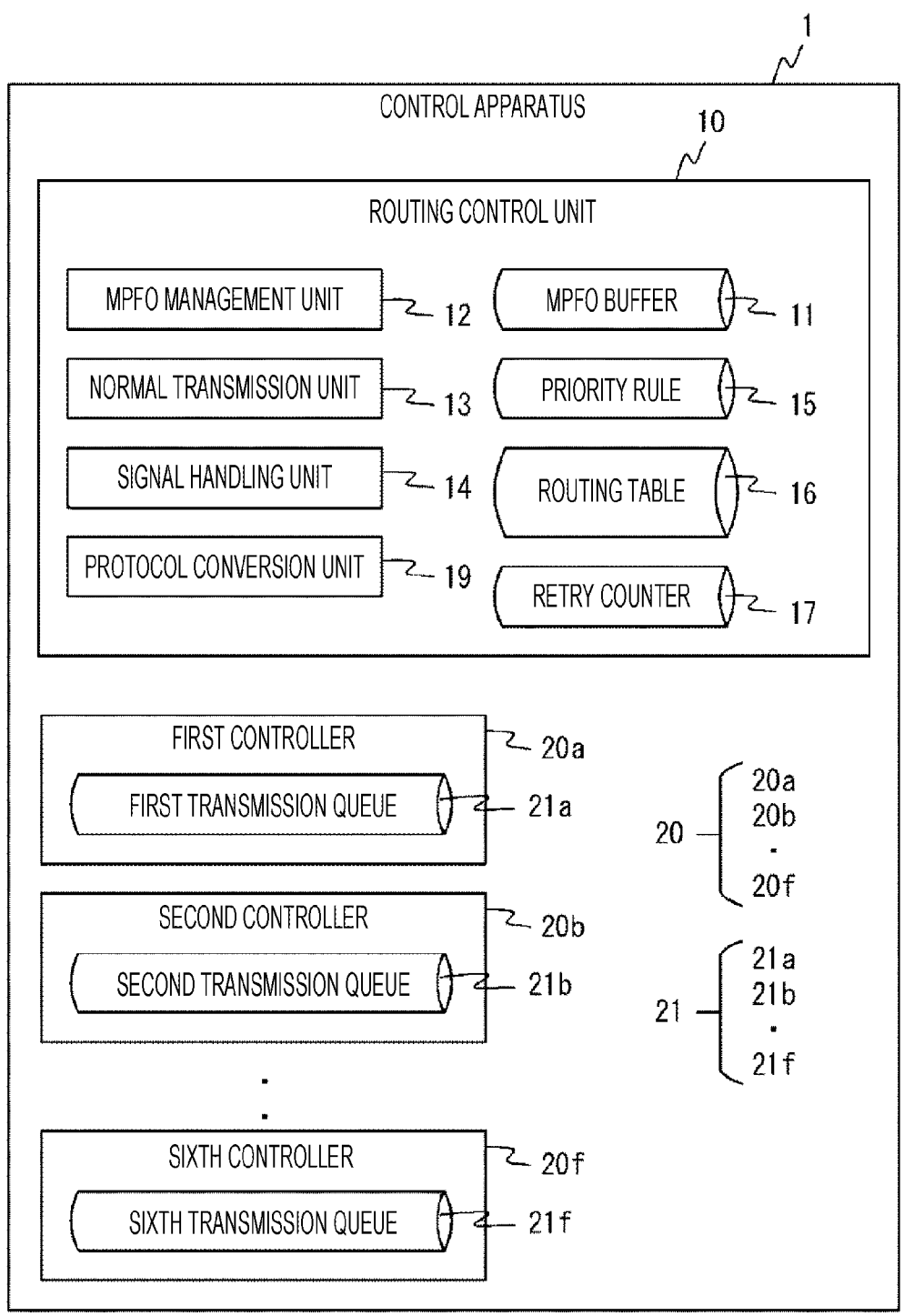
FIG. 2 is a functional block diagram showing a functional configuration of a control apparatus 1 in a first embodiment.

FIG. 2 is a functional block diagram showing a functional configuration of the control apparatus 1. However, FIG. 2 also shows storage areas and information used by functional blocks.

The routing control unit 10 includes an MPFO management unit 12, a normal transmission unit 13, a signal handling unit 14, and a protocol conversion unit 19. The routing control unit 10 further includes an MPFO buffer 11 serving as a storage area, and the flash memory 5 stores a priority rule 15, a routing table 16, and a retry counter 17. The term "MPFO" in the MPFO management unit 12 and the MPFO buffer 11 means most priority first out. The first to sixth controllers 20a to 20f include a first to sixth transmission queues 21a to 21f serving as storage areas. Hereinafter, the first transmission queue 21a, the second transmission queue 21b, the third transmission queue 21c, the fourth transmission queue 21d, the fifth transmission queue 21e, and the sixth transmission queue 21f will be collectively referred to as "transmission queues 21". Hereinafter, a state in which a number of frames are stored in the transmission queues 21 and no more frames can be stored therein will be referred to as "full state".

The MPFO management unit 12 stores, in the MPFO buffer 11, a frame that each controller 20 receives from the corresponding network. The normal transmission unit 13 transmits the frame stored in the MPFO buffer 11 to the transmission queue 21 of the controller 20 corresponding to the network serving as a transfer destination. When the routing control unit 10 receives a cancellation signal described later from the controller 20, the signal handling unit 14 executes processing for retransmitting the frame. Details thereof will be described later. The protocol conversion unit 19 processes a frame received by the controller 20 from the outside in accordance with the network serving as the transfer destination.

The MPFO buffer 11 stores the frame received by each controller 20 from the corresponding network. Note that a retransmission wait flag is added to each frame stored in the MPFO buffer 11. In an initial state in which a new frame is stored in the MPFO buffer 11, a value of the retransmission wait flag is set to zero indicating that the frame is not waiting for retransmission. However, the retransmission wait flag itself may not be set in the frame in the initial state, and, when the frame enters a wait state for retransmission, a value "1" indicating that the frame in a wait state for retransmission may be added.

The priority rule 15 stores priority of transfer for each identifier of the frame. In other words, a frame having higher priority defined in the priority rule 15 is preferentially transmitted to the transmission queue 21.

FIG. 3 shows an example of the priority rule 15. The example in FIG. 3 shows priority from 1 to 5 and IDs corresponding to the priority. For example, the priority is indicated by an integer of 1 or more, and a smaller numerical value has higher priority. When the priority rule 15 is as shown in the example of FIG. 3 and a total of three frames, i.e., frames having CAN-IDs "10" and "30" and a frame having a destination IF address "192.168.1.10", exist in the MPFO buffer 11, those frames are transmitted to the transmission queue 21 in the following order. Specifically, the frame having the CAN-ID "10", the frame having the destination IP address "192.168.1.10", and the frame having the CAN-ID "30" are transmitted in this order. Referring back to FIG. 2, description will be continued.

The routing table 16 stores a transfer destination channel and a retry bit for each ID of a frame. The transfer destination channel is not rewritten unless a network configuration or the like is changed. Meanwhile, the retry bit is rewritten according to a status of transfer of a frame to each network. The transfer destination channel is information indicating one or more networks serving as transfer destinations, and a channel corresponding to each network is specified. For example, in a case where a frame having a certain ID is transferred to the second and third networks, the transfer destination channels are shown as "2, 3". The retry bit is information indicating presence/absence of a frame to be retransmitted of each channel for each ID of the frame. For example, "1" indicates that the frame to be retransmitted exists, whereas "0" indicates that no frame to be retransmitted exists. The number corresponding to a larger channel number is described first. That is, in a case where the retry bit is "000001", only the first digit is "1". This indicates that a frame to be retransmitted exists only in a channel 1, and no frame to be retransmitted exists in channels 2 to 6.

FIG. 4 shows an example of the routing table 16. The first line in the example of FIG. 4 shows that a frame having the ID "10" is transferred to the channel "3", i.e., the third network. The frame having the ID "10" has a retry bit "000100". This indicates that a frame to be retransmitted exists in the third network. The second line in FIG. 4 shows that a frame having an ID of "20" is transferred to three networks because the transfer destination channel shows "3, 4, 5". The frame having the ID of "20" has a retry bit of "001100". This indicates that a frame to be retransmitted exists in the third and fourth networks. In other words, no frame to be retransmitted exists in the fifth network. A frame having the ID "30" shown in the third line of FIG. 4 has a retry bit "000000". This indicates that no frame to be retransmitted exists. Referring back to FIG. 2, description will be continued.

The retry counter 17 is information indicating existence of a frame to be retransmitted for each network serving as the transfer destination, more specifically, the number of IDs of frames to be retransmitted for each network serving as the transfer destination. The routing table 16 described above shows existence of a frame to be retransmitted to each channel for each ID of the frame. Therefore, it is necessary to check the retry bits of all the IDs in order to determine whether or not a frame to be retransmitted exists in a certain channel. However, by referring to the retry counter 17, it is possible to easily determine whether or not a frame to be retransmitted exists in a certain channel. The existence of the frame to be retransmitted indicates that the transmission queue is already full. Therefore, if the frame is transmitted to the transmission queue 21 of the channel in which the frame to be retransmitted exists, the frame is not accepted by the controller 20, and an error is returned. Therefore, in the present embodiment, no frame is transmitted to the transmission queue 21 of the channel in which the frame to be retransmitted exists. Details thereof will be described later.

FIG. 5 shows an example of the retry counter 17. The example of the retry counter 17 in FIG. 5 corresponds to the first to third lines of the routing table 16 in FIG. 4. Specifically, in FIG. 5, a counter value of the channel 4 is "1", and a counter value of the channel 3 is "2". This indicates that a single ID in which a bit in the fourth digit is "1" exists and two IDs in which a bit in the third digit is "1" exist in the retry bit of FIG. 4. The first, second, fifth, and sixth digits are all zero in the retry bit of FIG. 4, and thus the channels 1, 2, 5, and 6 are similarly zero as in the retry counter 17 of FIG. 5.

(Operation of Controller 20)

Detailed operation of the controller 20 will be described with reference to FIGS. 6 to 8. As described above, each controller 20 transmits/receives a frame not only to/from the connected network, i.e., the outside of the control apparatus 1, but also to/from the routing control unit 10 existing inside the control apparatus 1. Hereinafter, processing in which the controller 20 receives a frame from the outside of the control apparatus 1 will be referred to as "external reception processing", and processing in which the controller 20 receives a frame from the routing control unit 10 existing inside the control apparatus 1 will be referred to as "internal reception processing".

Figure 6:
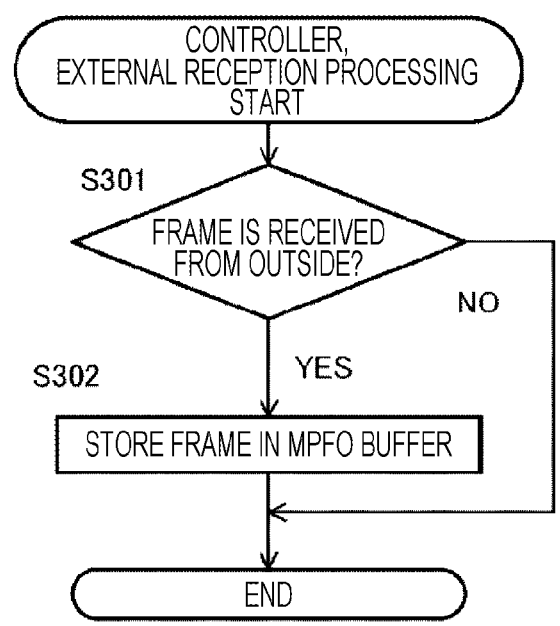
FIG. 6 is a flowchart showing external reception processing of a controller 20.

FIG. 6 is a flowchart showing the external reception processing in which the controller 20 receives a frame from the outside. The controller 20 executes the processing shown in FIG. 6 at predetermined time intervals, for example, every 1 ms.

In FIG. 6, in S301, first, the controller 20 determines whether or not a frame has been received from the outside. When the controller 20 determines that the frame has been received, the processing proceeds to S302. When the controller 20 determines that no frame has been received, the processing shown in the flowchart of FIG. 6 is terminated. In S302, the controller 20 stores the received frame in the MPFO buffer 11, and terminates the operation shown in FIG. 6. Strictly speaking, the received frame is not stored in the MPFO buffer 11 as it is in S302. The received frame is transmitted to the routing control unit 10, and is processed in the MPFO management unit 12 in the routing control unit 10.

Figure 7:
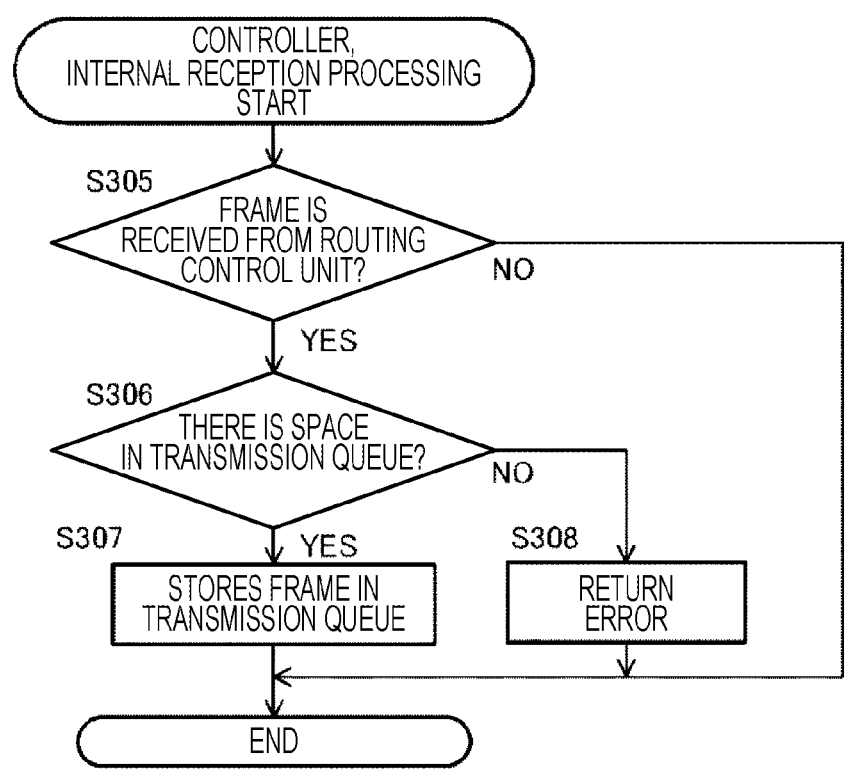
FIG. 7 is a flowchart showing internal reception processing of the controller 20.

FIG. 7 is a flowchart showing the internal reception processing. The controller 20 executes the processing shown in FIG. 7 at predetermined time intervals, for example, every 1 ms.

In FIG. 7, in S305, first, the controller 20 determines whether or not a frame has been received from the routing control unit 10. When the controller 20 determines that the frame has been received, the processing proceeds to S306. When the controller 20 determines that no frame has been received, the processing shown in the flowchart of FIG. 7 is terminated. In S306, the controller 20 determines whether or not there is a space in the transmission queue 21, in other words, whether or not the received frame can be stored in the transmission queue 21. When the controller 20 determines that there is a space in the transmission queue 21, the processing proceeds to S307. When the controller 20 determines that there is no space in the transmission queue 21, i.e., the transmission queue 21 is full, the processing proceeds to S308. In S307, the controller 20 stores the received frame in the transmission queue 21, and terminates the operation shown in FIG. 7. In S308, the controller 20 returns an error indicating that the frame cannot be accepted to the routing control unit 10, and terminates the operation shown in FIG. 7.

Figure 8:
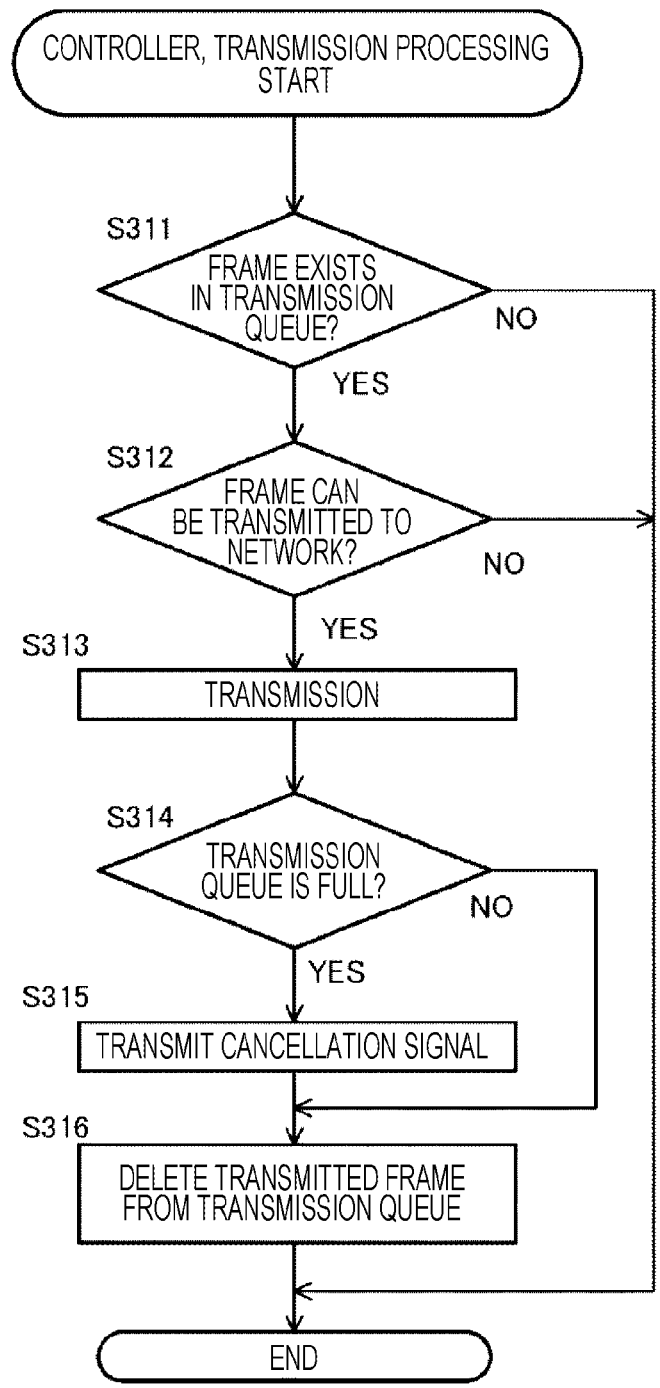
FIG. 8 is a flowchart showing transmission processing of the controller 20.

FIG. 8 is a flowchart showing processing in which the controller 20 transmits a frame to the outside. The controller 20 executes the processing shown in FIG. 8 at predetermined time intervals, for example, every 1 ms. In FIG. 8, in S311, first, the controller 20 determines whether or not a frame is stored in the transmission queue 21. When the controller 20 determines that a frame is stored in the transmission queue 21, the processing proceeds to S312. When the controller 20 determines that no frame exists in the transmission queue 21, the operation shown in FIG. 8 is terminated. In S312, the controller 20 determines whether or not the frame can be transmitted to the network. When the controller 20 determines that the frame can be transmitted to the network, the processing proceeds to S313. When the controller 20 determines that the frame cannot be transmitted to the network, the operation shown in FIG. 8 is terminated. Note that the case where the controller 20 makes a negative determination in S312 is, for example, a case where no network cable is connected or a case where transmission is waited according to the communication protocol.

In S313, the controller 20 transmits the frame to the network.

In the subsequent S314, the controller 20 determines whether or not the transmission queue 21 is full, in other words, whether or not, although a new frame could not be accepted so far, it is possible to newly transmit a frame because of the transmission in S313. When the controller 20 makes a positive determination in S314, the processing proceeds to S315. When the controller 20 makes a negative determination, the processing proceeds to S316. In S315, the controller 20 transmits a cancellation signal to the routing control unit 10. This cancellation signal includes a channel number in which the full state of the transmission queue 21 has been canceled. For example, because the controller 20a has the channel number "1", the controller 20a transmits a cancellation signal including information "CH1". In the subsequent S316, the controller 20 deletes the frame transmitted in S313 from the transmission queue 21, and terminates the operation shown in FIG. 8.

(Operation of MPFO Management Unit 12)

Figure 9:
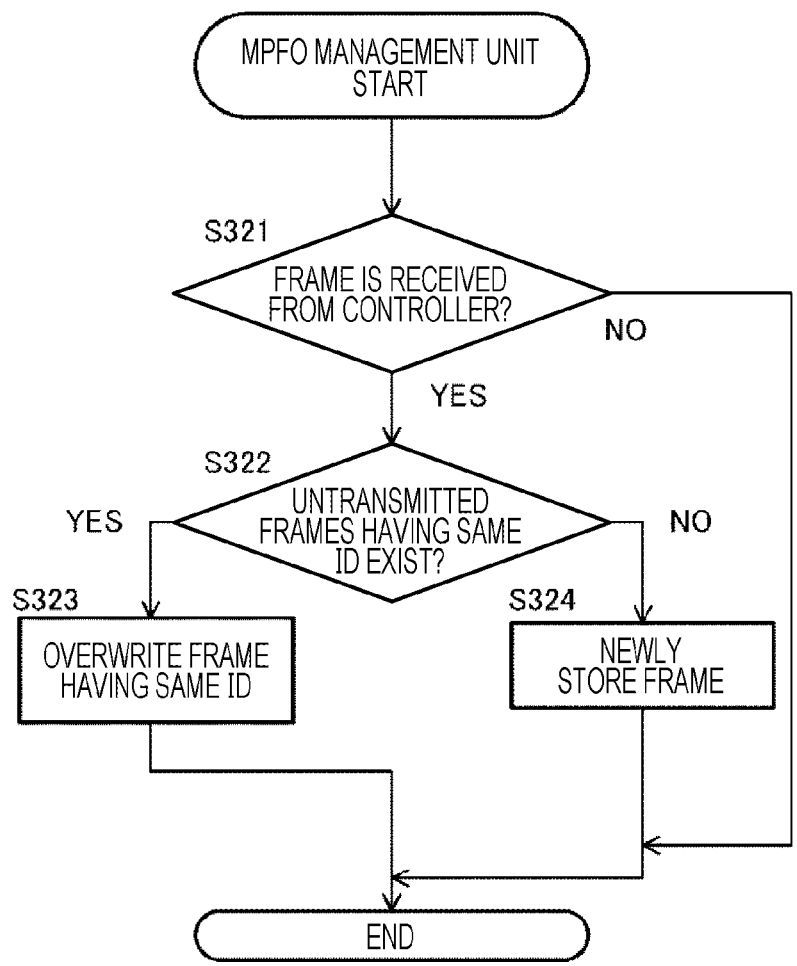
FIG. 9 is a flowchart showing operation of an MPFO management unit 12.

FIG. 9 is a flowchart showing operation of the MPFO management unit 12. The MPFO management unit 12 executes processing shown in FIG. 9 at predetermined time intervals, for example, every 1 ms. In FIG. 9, in S321, first, the MPFO management unit 12 determines whether or not a frame has been received from the controller 20. When the MPFO management unit 12 determines that the frame has been received, the processing proceeds to S322. When the MPFO management unit 12 determines that no frame has been received, the MPFO management unit 12 terminates a program whose operation is shown in FIG. 9.

The ID of the frame that is determined to have been received in S321 will be referred to as "received frame ID" in the description of FIG. 9. In S322, the MPFO management unit 12 determines whether or not a frame having the same ID as the received frame ID is stored in the MPFO buffer 11. When the MPFO management unit 12 determines that the frame having the same ID as the received frame ID is stored in the MPFO buffer 11, the processing proceeds to S323. When the MPFO management unit 12 determines that no frame having the same ID is stored, the processing proceeds to S324.

In S323, the MPFO management unit 12 overwrites the frame having the same ID as the received frame ID and stored in the MPFO buffer 11 with the frame determined to have been received in S321, and terminates the program whose operation is shown in FIG. 9. However, at this time, not all information is overwritten, and the value of the retransmission wait flag described later is maintained. In S324, the MPFO management unit 12 newly stores the frame determined to have been received in S321 in the MPFO buffer 11, and terminates the program whose operation is shown in FIG. 9.

(Operation of Normal Transmission Unit 13)

Figure 10:
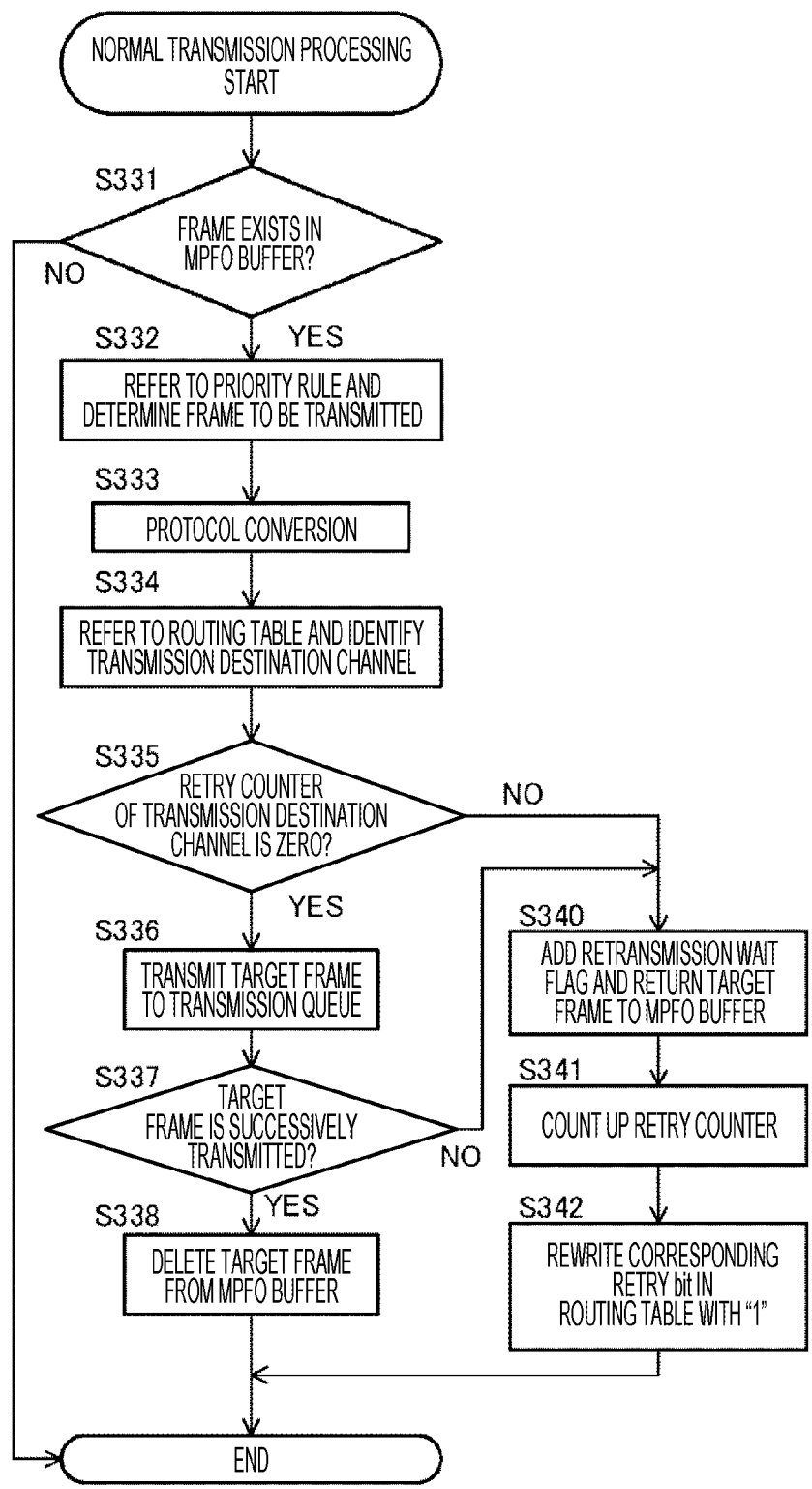
FIG. 10 is a flowchart showing operation of a normal transmission unit 13.

FIG. 10 is a flowchart showing operation of the normal transmission unit 13. As described above, the normal transmission unit 13 cannot directly transmit data to each network, and transmits a frame to be transmitted to each controller connected to the network.

In FIG. 10, first, the normal transmission unit 13 determines whether or not a frame exists in the MPFO buffer 11. When the normal transmission unit 13 determines that a frame exists in the MPFO buffer 11, the processing proceeds to S332. When the normal transmission unit 13 determines that no frame exists in the MPFO buffer 11, the normal transmission unit 13 terminates a program whose operation is shown in FIG. 10. However, in S331, the normal transmission unit 13 treats a flag having a retransmission wait flag as non-existent.

In S332, the normal transmission unit 13 refers to the priority rule 15, and determines a frame having the highest priority among frames existing in the MPFO buffer 11. Hereinafter, in the description of FIG. 10, this frame will be referred to as "target frame". In the subsequent S333, protocol conversion processing is performed on the target frame in accordance with the network serving as a transmission destination. This processing is executed by the protocol conversion unit 19. However, S333 is omitted when a communication protocol of a network serving as a transmission source is the same as that of a network serving as a transmission destination. In the subsequent S334, the normal transmission unit 13 refers to the routing table 16 and identifies a transmission destination channel. In the subsequent S335, the normal transmission unit 13 refers to the retry counter 17, and determines whether or not the retry counter of the transmission destination channel is zero, thereby determining whether or not the controller 20 of the transmission destination channel is in a full state. When the normal transmission unit 13 determines that the retry counter of the transmission destination channel is zero, i.e., the controller 20 corresponding to the transmission destination channel is not in a full state and the target frame can be stored in the transmission queue 21, the processing proceeds to S336. When the normal transmission unit 13 determines that the retry counter of the transmission destination channel is not zero, i.e., the controller 20 corresponding to the transmission destination channel is in a full state, the processing proceeds to S340.

In S336, the normal transmission unit 13 transmits the target frame to the transmission queue 21 of the transmission destination channel. Note that S336 is executed based on the following consideration: because the retry counter of the transmission destination channel is zero, the transmission queue 21 in the channel is not full at least at this time, and thus it is highly possible that the target frame is accepted by the transmission queue 21. In the subsequent S337, the normal transmission unit 13 determines whether or not the target frame has been successively transmitted to the transmission queue 21. When the normal transmission unit 13 determines that the target frame has been successively transmitted, the processing proceeds to S338. When the normal transmission unit 13 determines that the target frame has not been successively transmitted, the processing proceeds to S340. In S338, the normal transmission unit 13 deletes the target frame from the MPFO buffer 11, and terminates the program whose operation is shown in FIG. 10.

In S340 that is executed when a negative determination is made in S335 or S337, the normal transmission unit 13 adds a retransmission wait flag to the target frame and returns the target frame to the MPFO buffer 11. In the subsequent S341, the normal transmission unit 13 counts up the retry counter of the transmission destination channel, in other words, increments the retry counter. In the subsequent S342, the normal transmission unit 13 rewrites the corresponding retry bit in the routing table 16 with "1" and terminates the program whose operation is shown in FIG. 10. In a case where the corresponding retry bit is already "1" in S342, the corresponding retry counter must be "1" or more. Thus, a situation where the retry bit is further incremented from "1" cannot occur.

In a case where the transmission queue 21 has just become full and the retry counter is zero when the normal transmission unit 13 makes the determination in S335, the following processing is performed. First, a positive determination is made in S335, and the target frame is transmitted to the transmission queue 21 in S336. However, the controller 20 does not accept the target frame and returns an error because the transmission queue 21 is full (S306: NO, S308 in FIG. 7). In response to this, the normal transmission unit 13 makes a negative determination in S337, and counts up the retry counter in S341.

(Operation of Signal Handling Unit 14)

Figure 11:
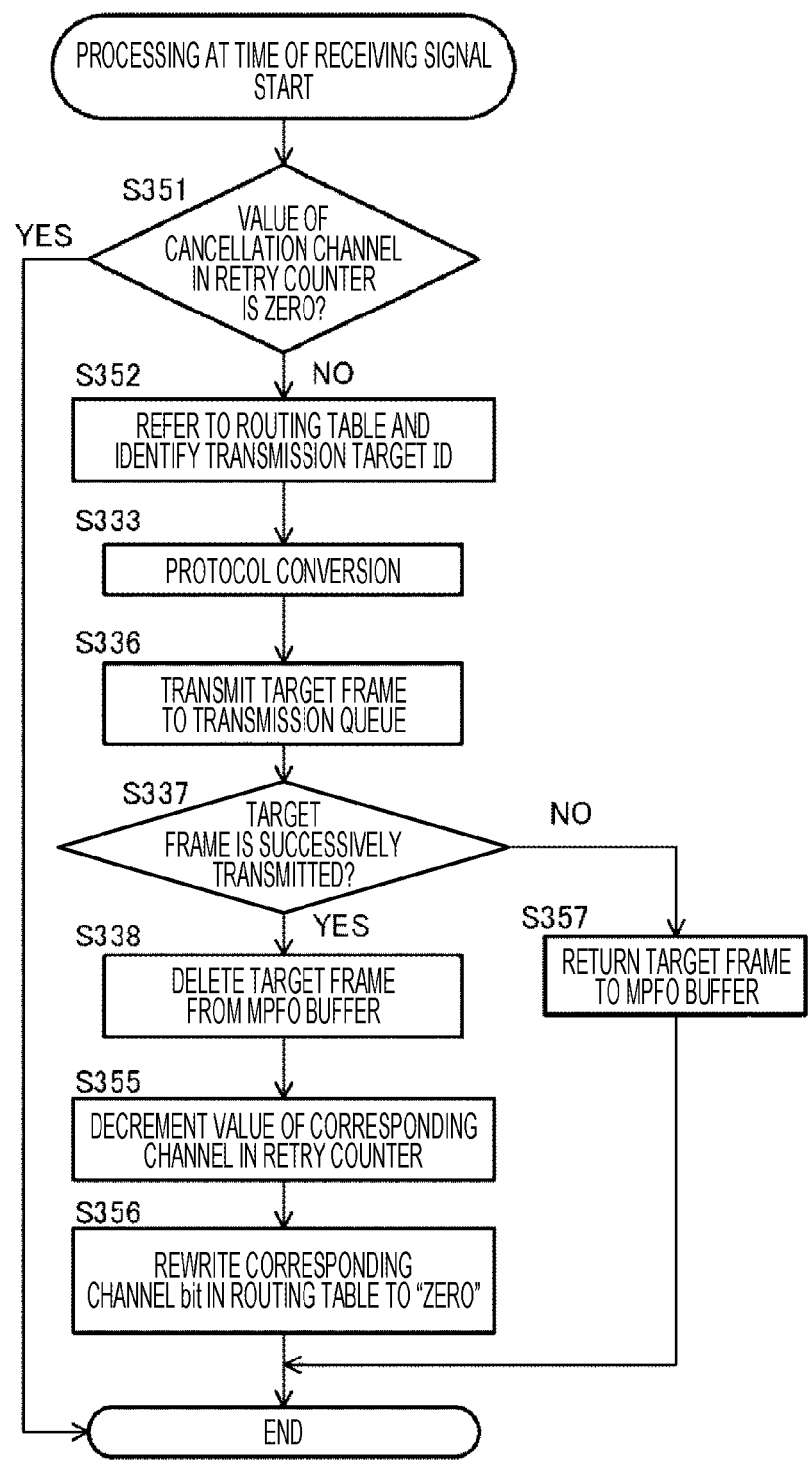
FIG. 11 is a flowchart showing operation of a signal handling unit 14.

FIG. 11 is a flowchart showing operation of the signal handling unit 14. When the signal handling unit 14 receives the cancellation signal from the controller 20 (S315 in FIG. 8), the signal handling unit 14 starts processing shown in FIG. 11. This cancellation signal includes the channel number having the transmission queue 21 in which the full state has been canceled. Hereinafter, the channel having the number included in the cancellation signal will also be referred to as "cancellation channel". In FIG. 11, the same steps as those in FIG. 10 are denoted by the same step numbers, and description thereof will be simplified.

In FIG. 11, in S351, first, the signal handling unit 14 determines whether or not the counter value of the cancellation channel in the retry counter 17 is zero. When the signal handling unit 14 determines that the counter value of the cancellation channel is zero, no special processing is required, and thus the signal handling unit 14 terminates a program whose operation is shown in FIG. 11. When the signal handling unit 14 determines that the counter value of the cancellation channel is not zero, the processing proceeds to S352. In S352, the signal handling unit 14 refers to the routing table 16 and identifies a transmission target ID. Specifically, the signal handling unit 14 identifies an ID having the highest priority among IDs whose retry bits corresponding to the cancellation channels in the routing table 16 are "1". For example, when the routing table 16 is as shown in FIG. 4 and the cancellation channel is "3", IDs whose retry bits corresponding to the cancellation channels are "1" are "10" and "20". Among those IDs, the ID "10" having higher priority is identified in this step. This identified frame will be referred to as "target frame" in the description of FIG. 11.

In the subsequent S333, the signal handling unit 14 performs protocol conversion of the target frame, and, in the subsequent S336, transmits the target frame to the transmission queue 21. In the subsequent S337, the signal handling unit 14 determines whether or not the target frame has been successfully transmitted to the transmission queue 21. When the signal handling unit 14 determines that the target frame has been successively transmitted, the processing proceeds to S338. When the signal handling unit 14 determines that the target frame has not been successively transmitted, the processing proceeds to S357. In S338, the signal handling unit 14 deletes the target frame from the MPFO buffer 11. In the subsequent S355, the signal handling unit 14 decrements the value of the cancellation channel in the retry counter 17, i.e., decreases the value by "1". The value of the retry counter 17 is an integer value equal to or greater than zero, and thus the value does not necessarily become zero after execution of this step. In the subsequent S356, the signal handling unit 14 rewrites the corresponding retry bit in the routing table 16 from "1" to "0", and terminates the program whose operation is shown in FIG. 11. In S357 that is executed when a negative determination is made in S337, the signal handling unit 14 returns the target frame to the MPFO buffer 11, and terminates the program whose operation shown in FIG. 11.

According to the first embodiment described above, the following effects can be obtained.

(1) The control apparatus 1 is connectable to a plurality of networks and transfers frames from a transfer source network to a transfer destination network. The control apparatus 1 includes: the routing control unit 10 that controls transfer of frames; the transmission queues 21, each of which is provided for a corresponding one of the plurality of networks, receives a frame from the network and inputs the frame to the routing control unit 10, and also stores the frame that is output from the routing control unit 10 and is to be transferred to the network serving as a transfer destination; and a plurality of controllers 20, each of which transmits the frame stored in the transmission queue 21 to the network. The routing control unit 10 includes the MPFO buffer 11 configured to store, among the inputted frames, a specified frame as a frame to be retransmitted, the normal transmission unit 13 configured to output, among the inputted frames, a frame other than the frame to be retransmitted to the transmission queue 21 of the controller 20 corresponding to the network serving as the transfer destination (S336 in FIG. 10), and, when the controller corresponding to the network serving as the transfer destination is in a full state in which no more frames cannot be stored in the transmission queue 21 (S335: NO or S337: NO), specify the inputted frame as the frame to be retransmitted and store the inputted frame in the buffer (S340), and the signal handling unit 14 configured to, upon receipt of a cancellation signal indicating that the full state has been canceled from any of the plurality of controllers 20, output, to the transmission queue 21 of the controller 20 that has transmitted the cancellation signal, the frame to be retransmitted that is to be transferred to the network corresponding to the controller 20 that has transmitted the cancellation signal (S336 in FIG. 11). When the full state is canceled, the controller 20 transmits the cancellation signal to the signal handling unit 14 (S315 in FIG. 8).

When the normal transmission unit 13 fails to transmit the frame to the transmission queue 21, the control apparatus 1 sets the frame as the frame to be retransmitted, and transfers a frame other than the frame to be retransmitted. Therefore, even when the frame to be retransmitted is generated, the control apparatus 1 can transfer frames with low latency. Then, when the routing control unit 10 receives the cancellation signal from the controller 20, the routing control unit 10 transmits the frame to be retransmitted to the transmission queue 21. Therefore, when a new frame cannot be transmitted to the transmission queue 21 because the network serving as the transfer destination is congested, the control apparatus 1 can transfer another frame, and can further transmit the frame to be retransmitted upon receipt of the cancellation signal. That is, the control apparatus 1 can transfer the frame and the frame to be retransmitted with low latency.

(2) The control apparatus 1 includes: the retry counter 17 configured to indicate the number of identifiers of the frames to be retransmitted for each of the plurality of networks; and the routing table 16 for showing one or a plurality of networks serving as the transfer destinations for each identifier of the frame, i.e., for each CANID or destination IP address, and presence or absence of the frame to be retransmitted for each identifier of the frame. The normal transmission unit 13 refers to the retry counter 17, and determines whether or not the controller 20 corresponding to the network serving as the transfer destination is in the full state (S335 in FIG. 10).

Specifically, the routing control unit 10 refers to the retry counter 17, and, when the value of the retry counter 17 of the transmission destination channel is not zero, determines that the transmission queue 21 is already in the full state in the controller 20 of the transmission destination channel, and does not transmit the frame to the transmission queue 21 of the controller 20. Therefore, it is possible to reduce a load on the controller 20. If the routing control unit 10 always transmits frames to the transmission queue 21, regardless of a state of the retry counter 17, a load, on the controller 20, of determination on whether or not the transmission queue 21 accept the frames, i.e., a load of the internal reception processing on the controller 20 is increased. Thus, it takes extra time to transmit the frames. Further, the routing control unit 10 refers to the retry counter 17, instead of the retry bits of all the IDs in the routing table 16. Thus, it is possible to promptly determine whether or not a frame to be retransmitted exists in a certain channel.

(3) The control apparatus 1 includes the MOFO management unit 12 configured to, when frames having the same identifier are received before being transferred, overwrite a previously received frame with a newly received frame, except for information indicating whether or not the frame is the frame to be retransmitted (S322: YES, S323 in FIG. 9). Therefore, the control apparatus 1 can transfer only the latest one of the frames having the same identifier.

(4) The frame received by the controller 20 from the outside has priority information indicating priority of transfer, i.e., an ID. The normal transmission unit 13 and the signal handling unit 14 transmit, to the controller 20, a frame having the highest priority among frames that can be transmitted to the controller 20. Therefore, the control apparatus 1 can preferentially transfer a frame having higher priority.

(5) The control apparatus 1 includes the protocol conversion unit 19 configured to process the received frame in accordance with the network serving as the transfer destination. Therefore, the control apparatus 1 can transfer a frame between networks having different communication protocols.

First Modification Example

In the first embodiment described above, a retransmission target flag is added to each frame to be stored in the MPFO buffer 11, and whether or not the frame is a frame to be retransmitted is determined based on a value of the flag. However, management of information indicating whether or not the frame is a target to be retransmitted is not limited thereto, and various methods can be used. For example, a table for managing frames to be retransmitted may be provided.

FIG. 12 shows an example of a retransmission management table 18 for managing frames be retransmitted. The retransmission management table 18 stores information indicating, for each frame ID, whether or not the frame is a target to be retransmitted, for example, "YES" or "NO". In the example in FIG. 12, only the frame ID "10" is a target to be retransmitted. "YES" is written to the retransmission management table 18 in the processing in S340 of FIG. 10, and "NO" is written thereto in the processing in S338 of FIG. 11

Second Modification Example

Figure 13:
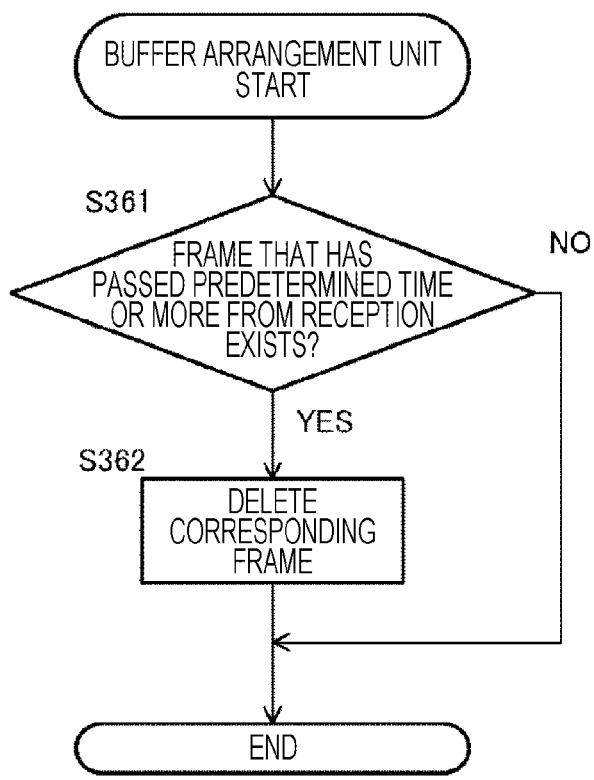
FIG. 13 is a flowchart showing operation of a buffer arrangement unit in a second modification example.

The routing control unit 10 may include a buffer arrangement unit that deletes an untransmitted frame that has passed a predetermined time or more from reception. FIG. 13 is a flowchart showing operation of the buffer arrangement unit. The buffer arrangement unit executes a program whose operation is shown in FIG. 13 at predetermined time intervals, for example, every 100 ms.

In FIG. 13, in S361, first, the buffer arrangement unit determines whether or not a frame that has passed a predetermined time or more from reception is stored in the MPFO buffer 11. When the buffer arrangement unit determines that a frame that has passed a predetermined time or more from reception is stored in the MPFO buffer 11, the processing proceeds to S362. When the buffer arrangement unit determines that a frame that has passed a predetermined time or more from reception does not exist in the MPFO buffer 11, the buffer arrangement unit terminates the program whose operation shown in FIG. 13. In S362, the buffer arrangement unit deletes the corresponding frame, i.e., the frame that has passed the predetermined time or more from reception, from the MPFO buffer 11, and terminates the program whose operation is shown in FIG. 13. In S362, a retransmission wait flag is also deleted. The predetermined time in S361 can be set to an arbitrary time. For example, the maximum delay time of communication defined by an application may be set.

According to this modification examples, the following effects can be obtained.

(6) The control apparatus 1 includes a buffer arrangement unit configured to discard a frame that has not been transferred within a predetermined time from reception. Therefore, the control apparatus 1 can discard a frame having old information, instead of transferring the frame.

Third Modification Example

In the embodiment described above, a plurality of IDs may be transferred to the same network. However, the IDs may be transferred to different networks, respectively. In this case, the value of the retry counter 17 represents the value of the retry bit in the routing table 16 as it is, and thus the routing table 16 does not need to include a retry bit column.

According to this modification examples, the following effects can be obtained.

(7) The control apparatus 1 includes the retry counter 17 configured to show existence of the frame to be retransmitted for each of the plurality of networks serving as the transfer destinations. The normal transmission unit 13 refers to the retry counter 17, and determines whether or not the controller corresponding to the network serving as the transfer destination is in the full state. As a result, when no frame to be transmitted exists in the network to which the frame is transmitted (S335: YES in FIG. 10), the received frame is transmitted to the transmission queue 21, and, when the frame to be transmitted exists in the network to which the frame is transmitted (S335: NO in FIG. 10), the received frame is not transmitted to the transmission queue 21. Therefore, in this modification example, the routing table 16 does not need to include a retry bit column.

Fourth Modification Example

In the embodiment described above, the protocol conversion unit 19 is a part of the routing control unit 10. However, the protocol conversion unit 19 may be independent from the routing control unit 10. In this case, the protocol conversion unit 19 may be realized by hardware, for example, an ASIC, or may be realized by software.

Second Embodiment

A second embodiment of the control apparatus will be described with reference to FIGS. 14 and 15. In the following description, the same components as those in the first embodiment will be denoted by the same reference signs, and differences will be mainly described. Points that will not be particularly described are the same as those in the first embodiment. This embodiment is different from the first embodiment mainly in that the control apparatus 1 does not include the retry counter 17.

(Configuration)

A hardware configuration of a control apparatus 1A in the second embodiment is the same as that of the control apparatus 1 in the first embodiment, and thus description thereof is omitted.

Figure 14:
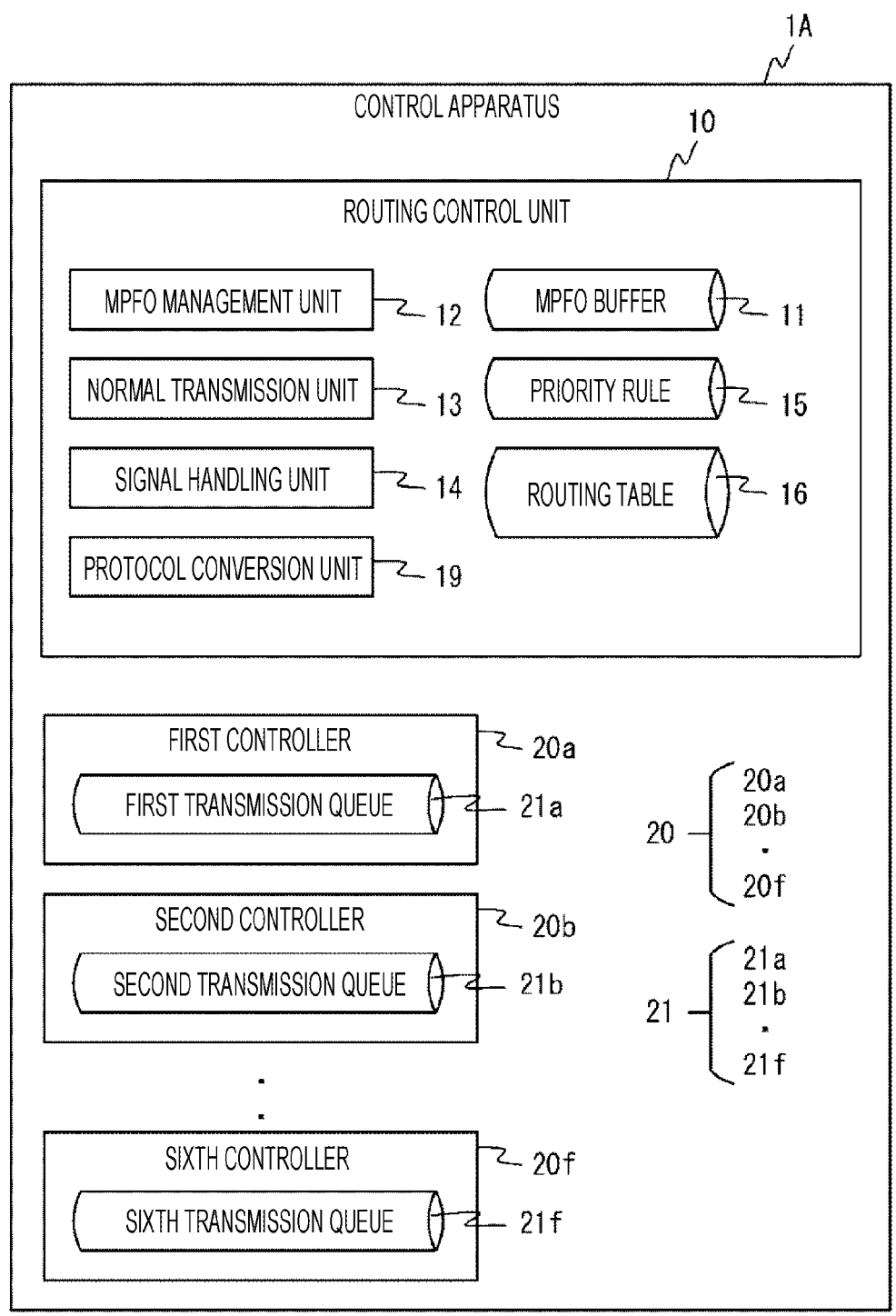
FIG. 14 is a functional block diagram showing a functional configuration of a control apparatus 1A in a second embodiment.

FIG. 14 is a functional block diagram showing a functional configuration of the control apparatus 1A in the second embodiment. The difference from the control apparatus 1 in the first embodiment is that the control apparatus 1A does not include the retry counter 17.

Figure 15:
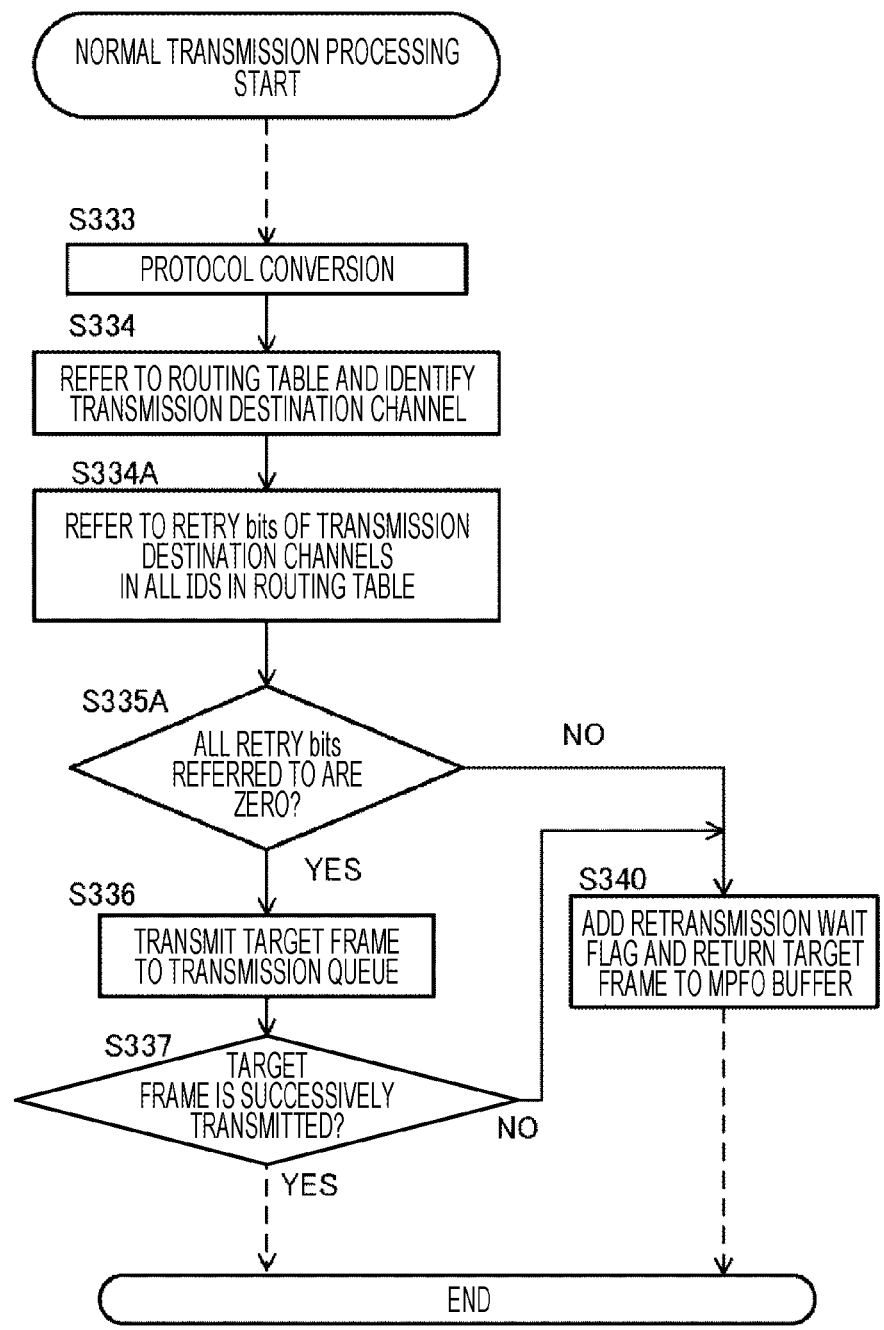
FIG. 15 is a flowchart showing processing of a normal transmission unit 13 in the second embodiment.

FIG. 15 is a flowchart showing processing of the normal transmission unit 13 in the second embodiment. The processing from start of operation to S334 is the same as that in the first embodiment, and thus description thereof is omitted. In S334A subsequent to S334, the normal transmission unit 13 refers to the retry bits of the transmission destination channels in all the IDs of the routing table 16. For example, when the transmission destination channel is the channel 3, the third bit from the end of the retry bit in each ID is referred to. In the subsequent S335A, the normal transmission unit 13 determines whether or not all the retry bits referred to are zero. For example, in the above example, it is determined whether or not the third bit from the end of the retry bit in each ID is zero. When the normal transmission unit 13 determines that all the retry bits referred to are zero, the processing proceeds to S336. When the normal transmission unit 13 determines that at least one retry bit referred to is not zero, the processing proceeds to S340. The processing in S336 and the processing in and after S340 are the same as those in the first embodiment, and description thereof is omitted.

According to the second embodiment described above, the following effects can be obtained.

(8) The control apparatus 1A includes the routing table 16 for showing, for each identifier of the frame, presence or absence of the frame to be retransmitted to the network. The normal transmission unit 13 refers to the routing table 16, and determines whether or not the controller 20 corresponding to the network serving as the transfer destination is in the full state (S334A, S335A in FIG. 15). As a result, when no frame to be retransmitted exists in all the IDs of the identifiers of the frames for the networks serving as the transfer destinations (S335A: YES in FIG. 15), the received frame is transmitted to the transmission queue. When a frame to be retransmitted exists in any of the IDs of the identifiers of the frames for the networks serving as the transfer destinations (S335A: NO in FIG. 15), the received frame is not transmitted to the transmission queue. Therefore, it is possible that the control apparatus 1A does not include the retry counter 17.

Although the programs are stored in a ROM (not shown), the programs may be stored in the flash memory 5. Further, the control apparatus 1 may include an input/output interface (not shown), and the programs may be read from another apparatus via the input/output interface and a medium that can be used by the control apparatus 1, when necessary.

Herein, the medium is, for example, a storage medium detachable from the input/output interface, a communication medium, i.e., a network such as a wired network, a wireless network, or an optical network, or a carrier wave or digital signal propagated through the network. Further, part or all of the functions implemented by the programs may be achieved by a hardware circuit or an FPGA.

The embodiments and the modification examples described above may be combined with each other. Although various embodiments and modification examples have been described above, the present invention is not limited to those contents. Other embodiments made within the scope of the technical idea of the present invention also fall within the scope of the present invention.

REFERENCE SIGNS LIST

1 control apparatus
10 routing control unit
11 buffer
12 management unit
13 normal transmission unit
14 signal handling unit
15 priority rule
16 routing table
17 retry counter
18 retransmission management table
19 protocol conversion unit
20 controller
21 transmission queue

The invention claimed is:

1. A control apparatus that is connectable to a plurality of networks and transfers frames between the plurality of networks, the control apparatus comprising:
   a routing controller configured to control transfer of the frames; and
   a plurality of controllers, wherein each controller is provided for a corresponding one of the plurality of networks, and includes a transmission queue configured to receive a frame from the corresponding one of the plurality of networks, each controller being configured to:
      input the received frame to the routing controller,
      store a frame which is output from the routing controller and which is to be transferred to a network of the plurality of networks serving as a transfer destination, and
      transmit the frame stored in the transmission queue to the network,
   wherein the routing controller includes:
      a buffer configured to store, among the inputted frames, a specified frame to be transmitted in response to transmission failure of the frame stored in the transmission queue,
      a normal transmitter configured to:
         output, among the inputted frames, a frame other than the specified frame to be transmitted to the transmission queue of a first controller of the plurality of controllers corresponding to the network serving as the transfer destination, and when the first controller of the plurality of controllers corresponding to the network serving as the transfer destination is in a full state in which no more frames can be stored in the transmission queue, specify the inputted frame as the specified frame to be transmitted and store the inputted frame in the buffer, and a signal handler configured to, upon receipt of a cancellation signal indicating that the full state has been canceled from any of the plurality of controllers, output, to the transmission queue of the first controller of the plurality of controllers which has transmitted the cancellation signal, the specified frame to be transmitted that is to be transferred to the network corresponding to the first controller of the plurality of controllers that has transmitted the cancellation signal; and when the full state is canceled, the first controller is configured to transmit the cancellation signal to the signal handler.

2. The control apparatus according to claim 1, wherein the routing controller further comprising a routing table for showing, for each identifier of a respective frame, wherein the identifier identifying at least the destination of the respective frame, presence or absence of the specified frame to be transmitted to the network, wherein the normal transmitter is configured to refer to the routing table, and to determine whether or not the first controller corresponding to the network serving as the transfer destination is in the full state.

3. The control apparatus according to claim 1, further comprising:

a retry counter configured to indicate a number of specified frames to be transmitted for each of the plurality of networks following transmission failure; and a routing table for showing one or a plurality of networks serving as the transfer destinations for each identifier of a respective frame and presence or absence of the specified frame to be transmitted for each identifier of the frame, the identifier identifying at least the destination of the respective frame, wherein the normal transmitter is configured to refer to the retry counter, and determine whether or not the first controller corresponding to the network serving as the transfer destination is in the full state.

4. The control apparatus according to claim 1, further comprising a manager configured to, when frames having the same identifier, the identifier identifying at least the destination of a respective frame, are received before being transferred, overwrite a previously received frame with a newly received frame, except for information indicating whether or not the frame is the specified frame to be transmitted.

5. The control apparatus according to claim 1, further comprising a buffer arranger configured to discard a frame that has not been transferred within a predetermined time from reception.

6. The control apparatus according to claim 1, wherein the received frame has priority information indicating priority of transfer; and the normal transmitter and the signal handler are configured to transmit, to the first controller, a frame having highest priority among frames that can be transmitted to the first controller.

7. The control apparatus according to claim 1, further comprising a protocol converter configured to process the received frame in accordance with the network serving as the transfer destination.

* * * * *